(12) United States Patent
Barton et al.

(10) Patent No.: US 6,234,578 B1
(45) Date of Patent: May 22, 2001

(54) SEATING ASSEMBLY AND METHOD OF MAKING SAME

(75) Inventors: Alan E. Barton, Walled Lake, MI (US); Richard D. Rhodes, Jr., Somersworth, NH (US); Ryan Weeks, Royal Oak, MI (US); Carl Kackenmeister, Stratham, NH (US); William David Plant, Anderson, SC (US); George F. Daniels, Stratham, NH (US)

(73) Assignee: McCord Winn Textron, Inc., Manchester, NH (US)

( * ) Notice: Subject to any disclaimer, the term of this patent is extended or adjusted under 35 U.S.C. 154(b) by 0 days.

(21) Appl. No.: 09/488,133

(22) Filed: Jan. 20, 2000

Related U.S. Application Data

(63) Continuation of application No. 09/076,184, filed on May 12, 1998, now Pat. No. 6,070,942.

(51) Int. Cl.⁷ .................................................. A47C 7/02
(52) U.S. Cl. ................... 297/452.41; 297/452.56; 297/452.65
(58) Field of Search .................. 297/452.41, 452.56, 297/452.65, 180.1, 180.15, 452.18, 452.2

(56) References Cited

U.S. PATENT DOCUMENTS

| | | | |
|---|---|---|---|
| 2,667,211 | * 1/1954 | Krasnov et al. | 297/225 X |
| 3,139,307 | * 6/1964 | Hawley et al. | 297/452.65 |
| 3,441,310 | 4/1969 | Gale . | |
| 3,499,682 | 3/1970 | Orenstein . | |
| 3,635,528 | 1/1972 | Strom . | |
| 3,669,496 | 6/1972 | Chisholm . | |
| 3,680,918 | 8/1972 | Briggs . | |
| 4,555,140 | 11/1985 | Nemoto . | |
| 4,826,229 | 5/1989 | Bradbury . | |
| 5,100,204 | * 3/1992 | Makihara et al. | 297/452.65 |
| 5,441,331 | * 8/1995 | Vento | 297/452.36 |
| 5,522,645 | 6/1996 | Dahlbacka . | |
| 5,658,050 | 8/1997 | Lorbiecki . | |
| 5,988,748 | * 11/1999 | Morrison et al. | 297/452.41 X |

* cited by examiner

*Primary Examiner*—Peter R. Brown
(74) *Attorney, Agent, or Firm*—Reising, Ethington, Barnes, Kisselle, Learman & McCulloch PC

(57) ABSTRACT

A vehicular seat (10) including a seat bottom (12) and a seat back (14). In one embodiment, the seat bottom (12) and seat back (14) are formed from a blow molded frame (16) including side walls (18) extending generally upwardly from a bottom panel (20). A support mat (32) comprising fabric/rubber webbing extends across a central cut-out region (28) in the bottom panel (20) and supports an inflatable cushion (48) comprising a series of air cells (50). An extensible upholstery or trim cover layer (56) covers the inflatable cushion (48) and is joined to the frame (16). In a second embodiment, the seat bottom (12) and seat back (14) are formed from a blow molded shell (62). An intermediate layer (64) of plastics material is provided on the shell (62) beneath an upholstery layer (68). An opening in the shell (62) allows the intermediate layer (64) to be expanded outwardly from the shell (62) as the pressure within the shell (62) is increased.

14 Claims, 4 Drawing Sheets

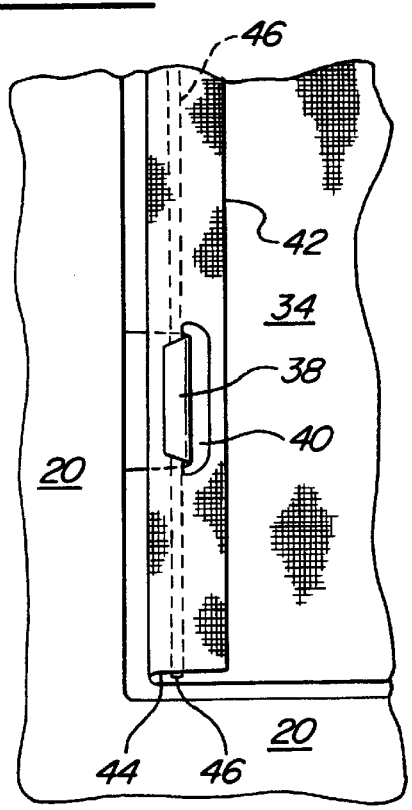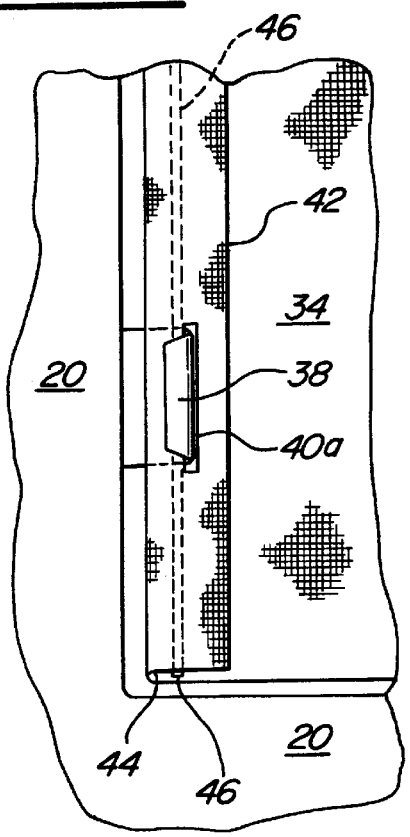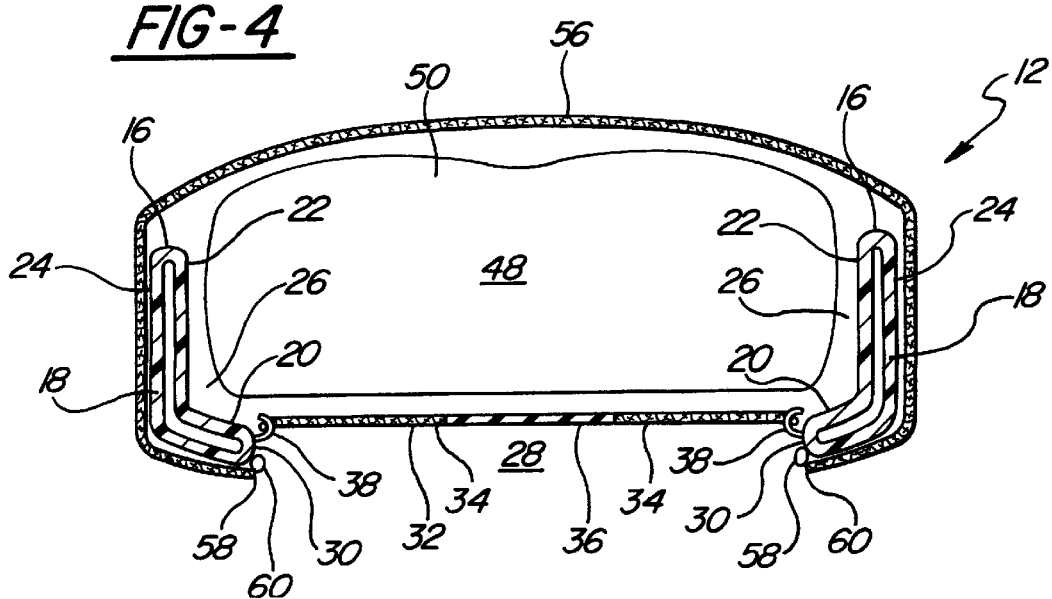

SEATING ASSEMBLY AND METHOD OF MAKING SAME

This is a continuation of application Ser. No. 09/076,184, filed on May 12, 1998, now U.S. Pat. No. 6,070,942, issued Jun. 6, 2000.

TECHNICAL FIELD

The subject invention generally relates to the manufacture and design of structures for supporting at least a portion of a human body and, more particularly, seats for use in vehicles.

BACKGROUND OF THE INVENTION

Vehicular seats generally include a rigid, metal frame supporting a foam cushion against which a passenger in the vehicle will rest. The frame typically includes a horizontal platform having a central opening therein. A series of sinuous metal springs extend across the opening to provide resilient support for the weight of the passenger, and the foam cushion is disposed on top of the platform. An upholstery cover is placed over the foam cushion and secured to the frame.

The central opening in the platform allows the springs to deflect downwardly as a passenger sits on the seat. Although the metal springs provide shock absorption and resilient support, a significant amount of foam is required to ensure that the seat is sufficiently comfortable, increasing the bulkiness of the seat. Further, both the metal seat frame and the foam add undesirable weight to the vehicle seat and, consequently, to the vehicle itself.

Therefore, it is desirable to provide a vehicular seat which provides sufficient comfort to a passenger without requiring a bulky foam cushion. It is also desirable to provide a vehicular seat including a suspension system which provides sufficient comfort and support for a passenger to reduce the amount of foam or other cushioning required by the standard spring construction.

SUMMARY OF THE INVENTION

The present invention provides a seat component comprising a frame including a cavity defined by a bottom panel and at least one side wall. The bottom panel includes a central cut-out region having a peripheral edge. A support mat is joined to the bottom panel and extends across the central cut-out region. An inflatable cushion is disposed within the cavity and supported by the support mat.

The present invention also provides a seat component comprising a blow molded shell with an intermediate layer of thermoplastic elastomer placed over at least a portion of an outer surface of the shell. A flexible cover is disposed over the intermediate layer and joined to the shell.

The present invention also involves a method of forming a seat component including blow molding a shell within a mold and placing an intermediate layer of thermoplastic elastomer over at least a portion of an outer surface of the shell. A flexible cover is attached to the shell over the intermediate layer.

Therefore, the present invention provides a seating concept that does not require the use of expensive and bulky urethane foam and eliminates the need for the standard metal spring suspension system in a vehicular seat.

BRIEF DESCRIPTION OF THE DRAWINGS

A complete understanding of this invention may be obtained from the following detailed description taken with the accompanying drawings in which:

FIG. 3. is an enlarged view of the seat bottom taken within circle 3—3 of FIG. 2;

FIG. 3A is an enlarged view of the seat bottom taken within circle 3—3 of FIG. 2 and showing an alternative embodiment of the support mat;

FIG. 4 is a cross sectional view of the seat bottom taken along line 4—4 of FIG. 1 including an inflatable cushion and an upholstery cover;

DETAILED DESCRIPTION OF THE INVENTION

Figure 1:
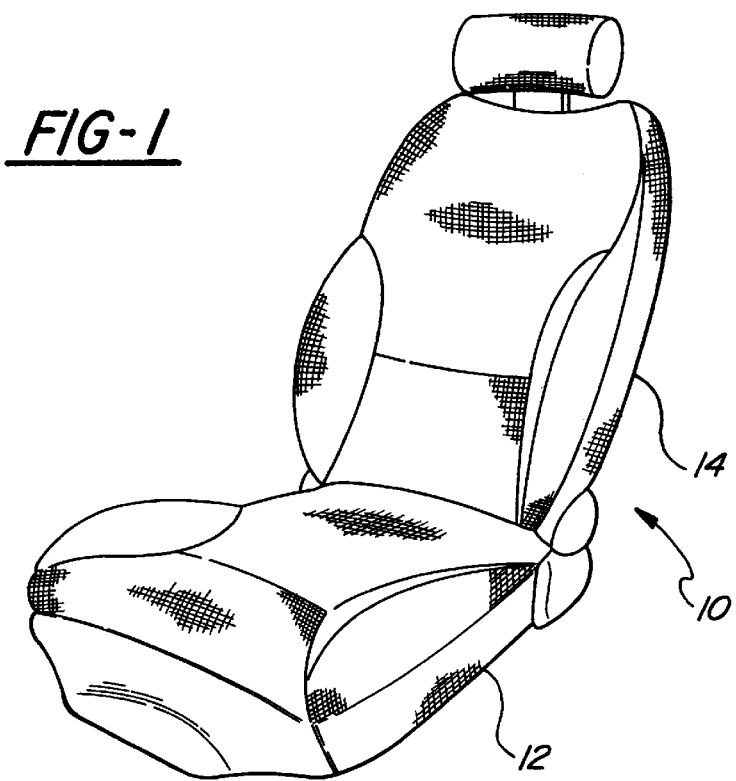
FIG. 1 is a perspective view of a vehicular seat including a seat back and a seat bottom.
Figure 5:
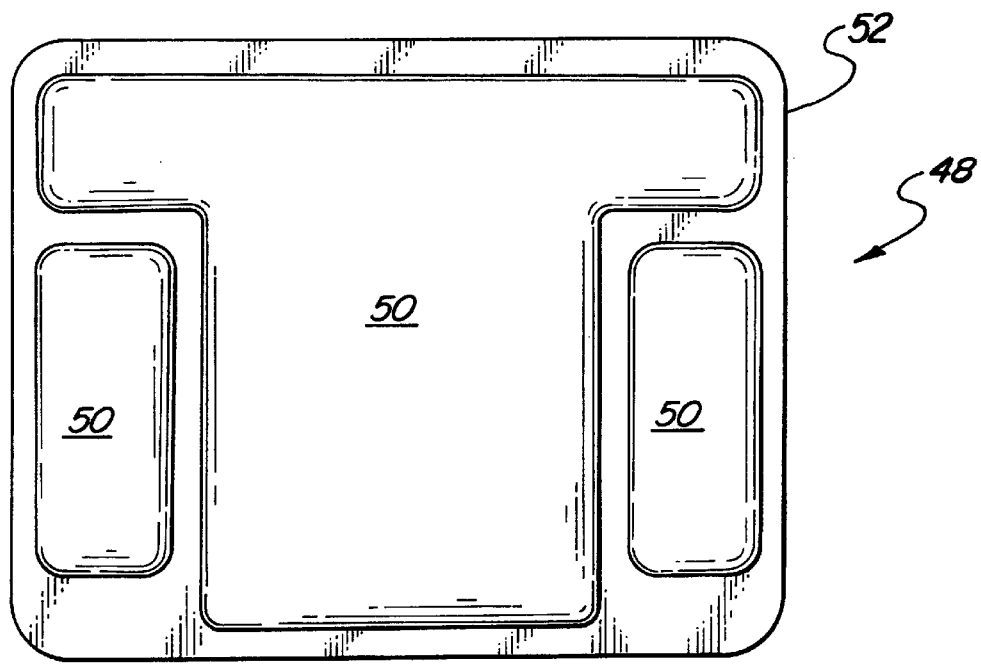
FIG. 5 a top view of a first embodiment of an inflatable cushion to be used in the seat bottom of FIG. 1.
Figure 6:
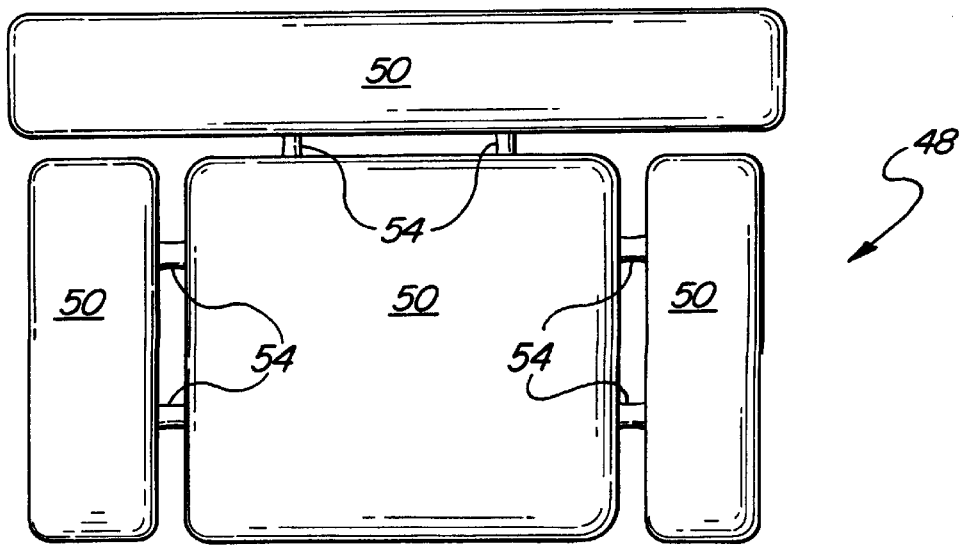
FIG. 6 is a top view of a second embodiment of an inflatable cushion to be used in the seat bottom of FIG. 1.
Figure 7:
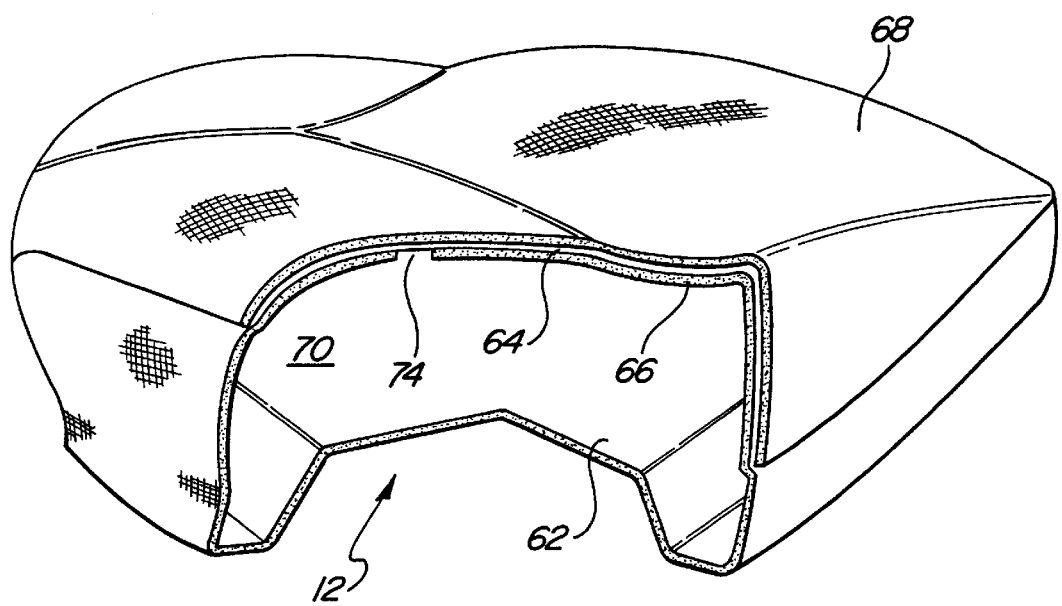
FIG. 7 is a perspective view of a second embodiment of the invention including a partial cut-away illustrating the various layers in the seat construction.
Figure 8:
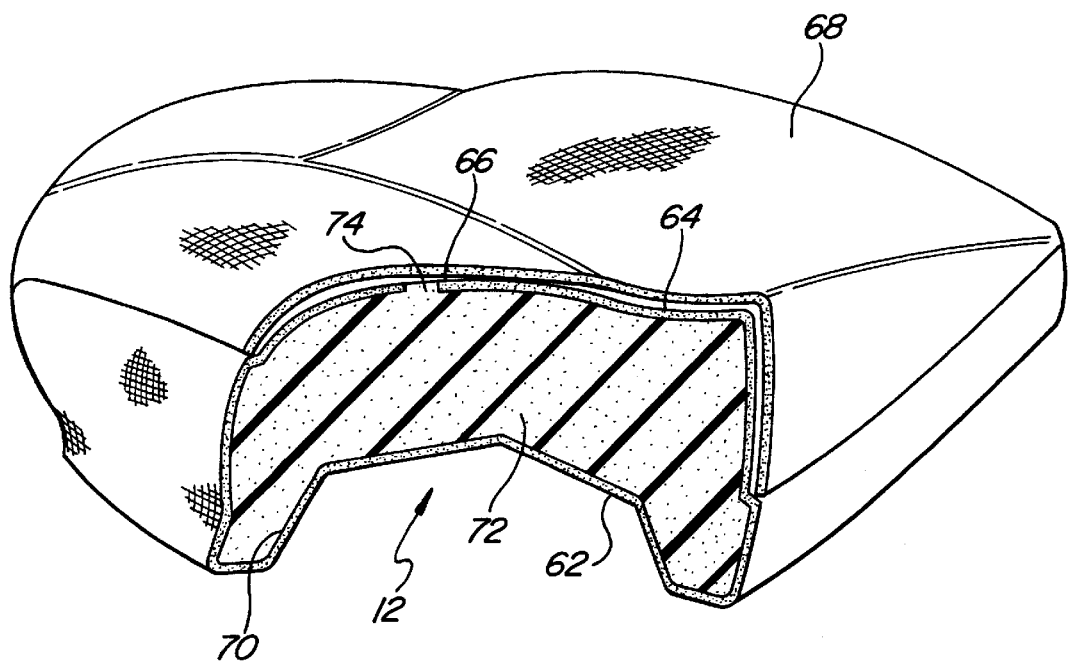
FIG. 8 is a perspective view of the seat bottom illustrated in FIG. 7 including foam injected within an internal cavity in the seat bottom.

Referring to FIG. 1, the present invention relates to a vehicle seat 10 including a seat bottom 12 and a seat back 14. As will be discussed in detail below, the present invention involves an improved suspension and cushioning system for the seat 10 which is applicable to both the seat bottom 12 and seat back 14. However, for convenience, the invention will be described only with respect to the seat bottom 12. FIGS. 2–6 illustrate a first embodiment of the invention, and FIGS. 7–8 illustrate a second embodiment of the invention.

Figure 2:
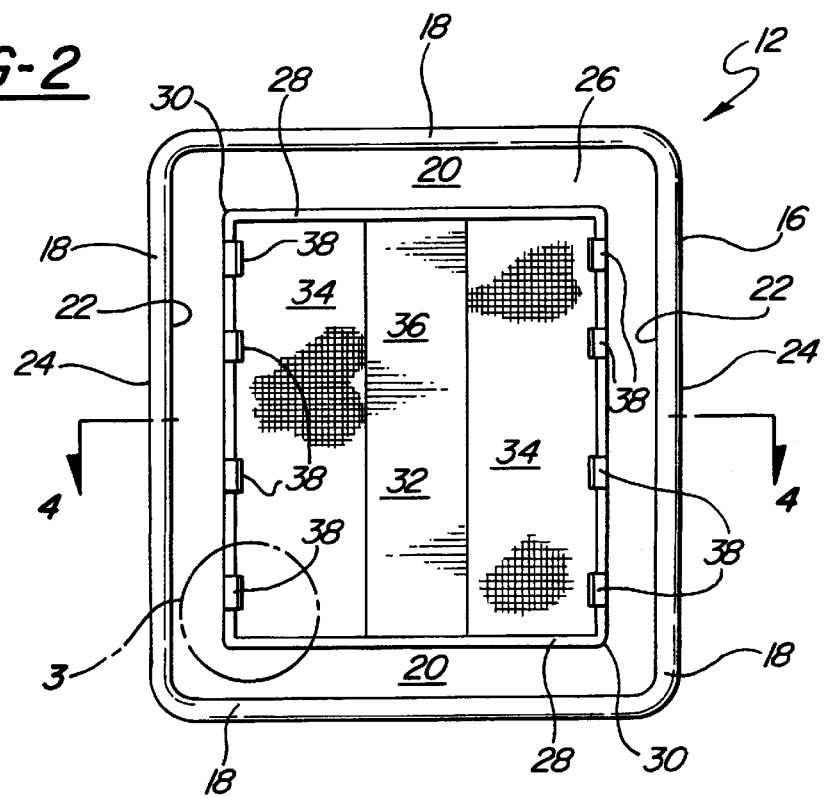
FIG. 2 is a top view of a seat bottom including a support mat extending across an opening in the pan.

As shown in FIGS. 2 and 4, the first embodiment of the invention includes a seat bottom 12 comprising a blow molded frame 16 with generally vertical side walls 18 extending upwardly from a bottom panel 20. In other embodiments the side walls 18 may be angled or curved rather than vertical. The bottom panel 20 and side walls 18 are hollow and formed by inner and outer layers 22 and 24, respectively, as shown best in the cross-sectional view of FIG. 4. This construction provides added rigidity and structural strength to the frame 16 while providing a thin and compact construction. The frame 16 is formed of any suitable rigid polymeric material such as polypropylene (PP) or high density polyethylene (HDPE) to provide strength without adding unnecessary weight to the seat bottom 12. Alternatively, the frame 16 can be formed of metal such as aluminum. The blow molded frame includes a cavity 25 configured to hold pressurized fluid and to act as an accumulator for servicing the air cells with pressurized fluid. The cavity 25 may also be used to receive heated or cooled air as part of a seat heating and/or cooling system.

The frame 16 defines a basin 26 surrounded and defined by the side walls 18 and the bottom panel 20. The bottom panel 20 includes a central cut-out region 28 surrounded by a peripheral edge 30. A support mat 32 is secured to the bottom panel 20 and extends across the central cut-out region 28.

The support mat 32 is formed of a fabric/rubber suspension material or webbing commonly known in the industry as Sisiara. This suspension material comprises two discrete sections of rubber coated fabric 34 joined together by a rubber strip 36 to form a single layer. In other embodiments the Sisiara mat may include more than one such rubber strip 36. The fabric sections 34 are able to support the weight of a passenger sitting on the seat bottom 12, but do not, by themselves, permit sufficient deflection to make the seat bottom 12 comfortable. The rubber strip 36, however, permits vertical deflection of the support mat 32 and allows the fabric sections 34 to be stretched apart as a passenger sits on the seat bottom 12. The fabric sections 34 and rubber strip 36 are integrally joined by calendaring, laminating, heating, chemical bonding, vibration welding, or another similar process. Suitable fabric/rubber support mats are described in detail in U.S. Pat. No. 3,902,756 issued to Chubb in Sepember 1975 and U.S. Pat. No. 3,981,538 issued to Chubb in Sepember 1976. These patents are incorporated herein by reference.

The rubber strip 36 can be smaller or larger than shown in FIGS. 2 and 4 depending upon the needs of the particular seat and the desired balance between support and resiliency. Further, the rubber strip need not be centered with respect to the mat 32 depending, again, upon the needs of the particular seat.

A plurality of tabs 38 are provided adjacent the peripheral edge 30 of the central cut-out 28 to provide attachment locations for the support mat 32. As shown best in the enlarged view of FIG. 3, the support mat 32 includes a plurality of openings 40 adapted to receive the tabs 38. In other embodiments, slits 40a may be included in the support mat 32 as shown in FIG. 3A, rather than the openings shown at 40 in FIG. 3. Such a mat 32 having slits 40a rather than openings 40 would be installed on the frame by stretching the mat fabric until each of the slits is pulled over one of the tabs 38. This is a self-locking system in the sense that occupant seat pressure would tend to further secure the support mat 32 on the frame 16. Hooks rather than tabs may be used to engage portions of the support mat 32 to attach the support mat 32 to the frame. Each fabric section 34 includes a longitudinal side edge 42 which is folded over and securely joined to the remainder of the fabric section 34 to define a pocket 44. A reinforcing metal rod 46 is disposed within the pocked 44 along the longitudinal sides 42 of the support mat 32. The reinforcing rod 46 engages the tabs 38 and prevents the tabs from tearing through the fabric sections 34 after repeated use of the seat bottom 12 or if a large force is applied to the support mat 32. The support mat 32 is stretched tightly across the central cut-out region 28 to preclude excessive sagging under the weight of a seat occupant.

As shown in FIG. 4, an inflatable air cushion 48 is disposed on the frame 16 and across the central cut-out 28 within the cavity 26 and is supported by the support mat 32. The cushion is placed in a desired position within the cavity 26 and then attached to the frame 16 using a pressure sensitive adhesive to prevent unwanted movement of the cushion 48 relative to the frame 16. Two embodiments of the air cushion 48 are shown in FIGS. 5 and 6. In both embodiments, the inflatable cushion 48 comprises a plurality of air cells 50 which are each individually inflatable. In the embodiment shown in FIG. 5, the cushion 48 comprises a laminated mat 52 having air pockets 50 formed therein. In the embodiment shown in FIG. 6, the cushion 48 comprises discrete air cells 50 joined together by connecting members 54 such as elastic or fabric strips or by air tubes. The air tubes may also serve to connect separate air cells 50 into a single air cell zone with all the cells 50 in the zone having the same air pressure.

The pressure within the air cells 50 of the inflatable cushion 48 can be adjusted as desired to achieve an optimal comfort level. The seat 10 is most comfortable when the air pressure with the air cells 50 is kept below 3 psi. Each air cell 50 or air cell zone can be individually inflated to respective individual pressure levels provide support tailored to the needs of different passengers.

Air cell inflation pressure can be controlled either manually or automatically. In automatic systems, a controller or control system can be provided which incorporates a microprocessor programmed to adjust air cell 50 or air cell zone pressure levels according to a predetermined passenger comfort algorithm. The microprocessor is configured to receive signals from pressure transducers that monitor inflation pressure within each air cell 50 or air cell zone and to adjust inflation as a passenger changes position on the seat 10 or to compensate for the physical characteristics of a new seat occupant. The controller adjusts inflation pressure by releasing inflation pressure through one or more relief valves and/or increases inflation pressure by admitting pressurized air to the air cells 50 from a pressurized air source such as a motor pump unit. The controller may comprise any suitable electronic control system known in the art, but preferably comprises the system described in detail in U.S. Pat. application Ser. No. 08/808,511 and identified under the trade name ASCTec™. U.S. Pat. application Ser. No. 08/808,511 was filed Feb. 27, 1997, is assigned to the assignee of the present invention and is incorporated herein by reference.

Unlike a standard foam cushion, the air cushion 48 can also be deflated to permit the seat 10 to be folded compactly for storage. The air cushion 48 may also be deflated or further inflated to assist a seat occupant in egressing the seat 10.

As shown in FIG. 4, the seat bottom 12 includes a cover in the form of an upholstery layer 56 disposed over the inflatable cushion 48 and securely joined to the frame 16. The upholstery layer 56 includes an elastic band 58 sewn into a peripheral edge 60 of the upholstery 56 to securely hold the upholstery 56 to the frame 16. Although not shown in FIG. 4, other attachment means can also be provided including the use of standard J-hooks or other means known to persons skilled in the art. To add softness and improve aesthetics, one-half inch of foam can be laminated to an underside of the upholstery layer 56.

The cover or upholstery layer 56 is extensible in that it is configured to expand with air cell inflation. Extensibility may be achieved either through the use of a stretch fabric, or by incorporating pleats into the fabric. Such pleats would preferably be formed along trim lines adjacent the peripheral edge 60 of the upholstery 56 and would pull apart or open in response to the weight of an occupant and/or air cell inflation. Cover extensibility may also be achieved through the use of elastic members such as bungee cords or springs that connect the peripheral edge 60 of the upholstery 56 to a support structure such as the seat frame 16 or between opposing portions of the peripheral edge 60.

Thus, the first embodiment of the invention provides a low profile, lightweight, adjustable seating concept that eliminates the need for urethane foam or other expensive, bulky, and environmentally unfriendly cushioning materials and provides improved comfort and adjustable surface control.

A second embodiment of the invention is shown in FIGS. 7 and 8 and includes a seat bottom 12 formed from a blow molded shell 62 of high density polyethylene (HDPE). An intermediate layer 64 of a plastics material such as thermoplastic elastomer (TPE) is placed over a portion of the outer surface 66 of the shell 62 to provide a soft feel to the seat bottom 12 and added comfort. In other embodiments the intermediate layer 64 may comprise thermoplastic elastic olefin (TPO) or thermoplastic urethane (TPU) rather than TPE. A flexible upholstery cover 68 is applied over the intermediate layer 64 and is attached to the blow molded shell 62 in any manner well know to those skilled in the art including J-hooks or an elastic band as discussed above with respect to the first embodiment.

In the preferred embodiment, the shell 62 forms a hollow internal cavity 70 which is left empty as shown in FIG. 7. Alternatively, as shown in FIG. 8, a foam blow agent 72 can be injected within the internal cavity 70 of the shell 62 as the seat bottom 12 is manufactured to provide both sound dampening as well as added cushioning and support for the shell 62. The hollow internal cavity 70 may be used as an air accumulator for heating, cooling or massaging a seat occupant.

The shell 62 includes an opening 74 adjacent the intermediate layer 64 which allows the intermediate layer 64 to be extended outwardly from the shell 62 to provide lumbar support (for a seat back 14) or other similar improvements to the comfort of the seat 10. Because the intermediate layer 64 is made of resilient thermoplastic elastomer, it can be forced to bulge outwardly from the opening 74 if the air pressure within the cavity 70 is increased. Thus, the intermediate layer 64 can provide added cushioning for the comfort and support of a passenger.

The method of forming the second embodiment of the seat 10 is as follows. First, the shell 62 is formed by blow molding high density polyethylene (HDPE) into a desired shape within a blow mold. If desired, after the shell 62 has been blow molded, the foam blow agent 72 can be injected within the shell 62. Colored dye can also be added to the HDPE during the molding process to provide molded-in color. After the shell 62 has cooled within the mold but before the shell 62 has been removed, the intermediate layer 64 of thermoplastic elastomer (TPE) and the upholstery layer 68 are secured the shell 62 with pressure sensitive adhesive or the like. Conversely, the TPE film can be insert molded by placing it in the mold during the blow-molding process.

The second embodiment provides a seat design that does not rely on conventional seating structures such as a metal fame, springs, and the like and instead provides a lightweight blow molded object which is relatively easy and cost effective to manufacture. The seat is a particularly attractive option for use as a removable seat in a minivan. Such seats can be very cumbersome to remove due to the weight of the metal frame, metal springs, and heavy urethane foam. The seat of the present invention sacrifices little, if anything, in terms of comfort while providing a substantially lighter seat.

Other variations and modifications are possible without departing from the scope and spirit of the present invention. For example, although the above description relates specifically to an automotive seat, the invention is also applicable to many other devices configured to support a human body or a portion of a human body-devices such as sofas and beds. For a complete definition of the invention, please refer to the attached claims.

We claim:

1. A support component comprising:
    a frame including a basin defined in part by a bottom panel and at least one wall extending generally upwardly from the bottom panel, the bottom panel including a central through-hole defined by a peripheral inner edge that extends along and adjacent a full perimeter of the bottom panel;
    a support mat having a peripheral outer edge joined to the bottom panel around the central through-hole and extending across the central through-hole; and
    an inflatable cushion disposed on the frame and across the through-hole and supported by the support mat;
    the wall bounding the central through-hole and the bottom panel and wall including inner and outer spaced layers to provide increased rigidity and strength for bearing loads suspended across the through-hole on the mat while allowing thin and compact frame construction.

2. A support component as defined in claim 1 in which the frame is blow molded.

3. A support component as defined in claim 1 in which the support mat includes a fabric/rubber webbing.

4. A support component as defined in claim 1 in which the cushion is adhesively joined to the support mat.

5. A support component as defined in claim 1 in which the frame is configured for use as a seat bottom.

6. A support component as defined in claim 1 in which the frame is in a shape adapted for use as a seat back.

7. A support component as defined in claim 1 including an extensible trim cover disposed over the cushion and secured to the frame.

8. A support component as defined in claim 7 in which the extensible trim cover comprises stretchable fabric.

9. A support component as defined in claim 7 in which the extensible trim cover comprises pleats formed in the cover.

10. A support component as defined in claim 7 in which the extensible trim cover comprises elastic members connected between the trim cover and the frame.

11. A support component as defined in claim 1 in which the frame is a single unitary piece.

12. A support component as defined in claim 1 in which at least a portion of the frame is hollow.

13. A support component as defined in claim 1 in which a peripheral outer edge of the support mat is disposed laterally within the peripheral inner edge defining the central through-hole.

14. A method of forming a support component comprising:
    blow molding a shell within a mold;
    placing an intermediate layer of a plastics material over at least a portion of an outer surface of the shell;
    attaching a flexible cover to the shell over the intermediate layer;
    forming an opening in the shell adjacent the intermediate layer; and
    increasing fluid pressure within the shell until the layer of plastics material bulges through the opening in the shell.

* * * * *